(12) United States Patent
Maass et al.

(10) Patent No.: US 6,302,470 B1
(45) Date of Patent: Oct. 16, 2001

(54) CONVERTIBLE VEHICLE

(75) Inventors: Joachim Maass, Bissendorf; Frank Lehnig, Osnabrueck, both of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/531,202

(22) Filed: Mar. 20, 2000

(30) Foreign Application Priority Data

Mar. 19, 1999 (DE) .............................................. 199 12 357

(51) Int. Cl.[7] ...................................................... G60J 7/00
(52) U.S. Cl. .................. 296/107.07; 296/146.14
(58) Field of Search ........................ 296/146.14, 107.07, 296/107.12

(56) References Cited

U.S. PATENT DOCUMENTS

| | | | |
|---|---|---|---|
| 4,626,020 | * 12/1986 | Kaltz et al. ................. | 296/107.07 X |
| 4,784,428 | * 11/1988 | Moy et al. ...................... | 296/107.07 |
| 5,195,798 | * 3/1993 | Klein et al. ................. | 296/107.07 X |
| 6,123,381 | * 9/2000 | Schenk ............................. | 296/107.07 |

* cited by examiner

*Primary Examiner*—Joseph D. Pape
(74) *Attorney, Agent, or Firm*—Jordan and Hamburg LLP (57) ABSTRACT

A convertible vehicle with a roof, which can be folded up, is provided with a rear window, can be stowed in a rear region of the vehicle and is braced over at least one tension bracket in the closed state with respect to the car body, the tension bracket being pivotable in the forwards direction for opening the roof and hereby bringing about a forward displacement of the rear window. In the case of such a construction, in order to be able to carry out the forward shifting of the rear region of the folding top, comprising the rear window, without being obstructed by upright parts, such as the rear head supports or roll bars, provisions are made so that the rear window is held in a frame which, on the folding top side, is opened downward and, during the opening and closing of the roof, can be swiveled up with respect to this frame.

29 Claims, 12 Drawing Sheets

CONVERTIBLE VEHICLE

BACKGROUND OF THE INVENTION

The invention relates to a convertible vehicle with a rear window.

Convertible vehicles are known, for which the rear window is shifted towards the front while the roof is being opened or closed, in order to enable, by these means, one or more rear tension brackets to be swiveled up which, in the closed state, stretch the roof against the car body and lie, for example, on a lid of the box for the folding top, so that the swiveling up of the tension brackets is a prerequisite for being able to stow the roof. While the rear window is shifted forwards during opening or closing the roof, contact, especially of rear passengers or of solid obstacles, such as rear headrests or roll bars, with the rear window cannot be excluded.

It is an object of the invention to eliminate this disadvantage.

Due to the inventive construction of a convertible vehicle, the rear folding top region, including the rear window, can be shifted forwards while the roof is being opened or closed in spite of any obstacles, since the rear window can be swiveled up with respect to the frame, which ties the window into the folding top. As a result, the frame can pass to the side of and above the obstacles, without colliding with them. The collision between the rear window and the obstacles mentioned is avoided by this swiveling up.

If the swiveling up of the rear window is forcibly coupled with the opening or closing mechanism of the roof, a collision is prevented even without the operation of an additional control unit for the swiveling up. The user then does not have to carry out any further steps aside from the manual or automatic opening or closing of the roof.

Particularly advantageously, a swiveling lever arrangement for swiveling up the rear window is provided and can also be actuated independently of the opening or closing of the roof, so that the rear window can be swiveled into a venting position when the roof is closed.

If the rear window additionally can be lowered into the car body, then this possibility is an alternative for bringing about a venting position and, when the roof is open, the rear window, as a component of the roof, is then also stowed in the rear region of the vehicle.

When the rear window is essentially in a vertical position, the visibility towards the rear is particularly good. If the rear window is supported in a rigid frame, the glass pane may be constructed with heating wires or an antenna.

Further advantages and distinguishing features arise out of the examples of the object of the invention which are shown in the accompanying drawings and description.

DESCRIPTION OF THE PREFERRED EMBODIMENTS

Figure 1:
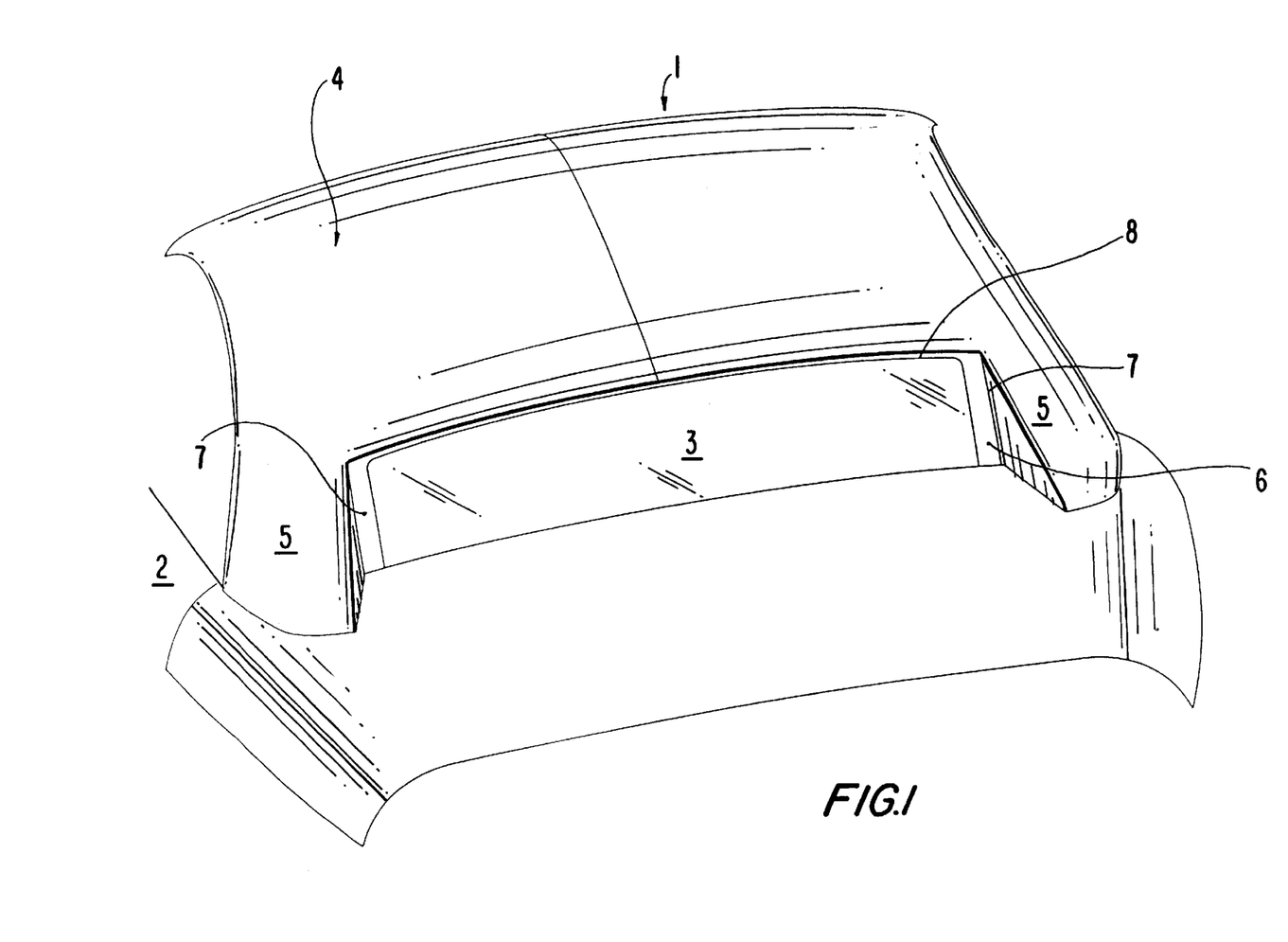
FIG. 1 shows a perspective, diagrammatic partial rear view of an inventive convertible vehicle.

The inventive motor vehicle 1 is constructed as a convertible vehicle and has a roof 4, which can be folded open, stowed in the rear region of the vehicle of a car body 2 and is provided with a rear window 3, which is assigned to the roof 4. When the roof 4 is opened or closed, the rear window 3 can be moved along with the roof 4.

In the present example, the convertible vehicle 1 has a roof 4 with a textile covering, which includes in its rear region two lateral end regions 5, which protrude towards the rear, are essentially triangular in plan view and in front of which and between which the rear window 3 is mounted. By these means, the rear window 3 can be held in an approximately vertical position, which ensures very good visibility towards the rear. An inventive convertible vehicle can also have an inclined rear window in a conventional end region of a roof, which is provided with a tension bracket.

The rear window 3 is held in a U-shaped frame 6, which is open in the downward direction and comprises two short side legs 7 as well as a long, upper transverse leg 8.

The rear window 3 is hinged in the upper region with respect to the frame 6 enclosing it and, as a result, mounted in the lower region so that it can be swiveled open in the direction of arrow 34. So that the rear window 3 can be swiveled, a swiveling axis 32 is provided in the transverse leg 8 of the frame 6. The rear window 3 can be swiveled up about the swiveling axis 32 in the direction of the arrow 34. In so doing, it can be lifted off from a contact seal 36 along a parting plane 35. The folding top material 33 of the roof 4 is pulled around a portion of the transverse leg 8 of the frame 6 and sealed by a seal 37 with respect to the rear window 3. This seal 37 is flexible, so that is functions effectively when the rear window 3 is closed as well as when it is swiveled up.

Figure 2:
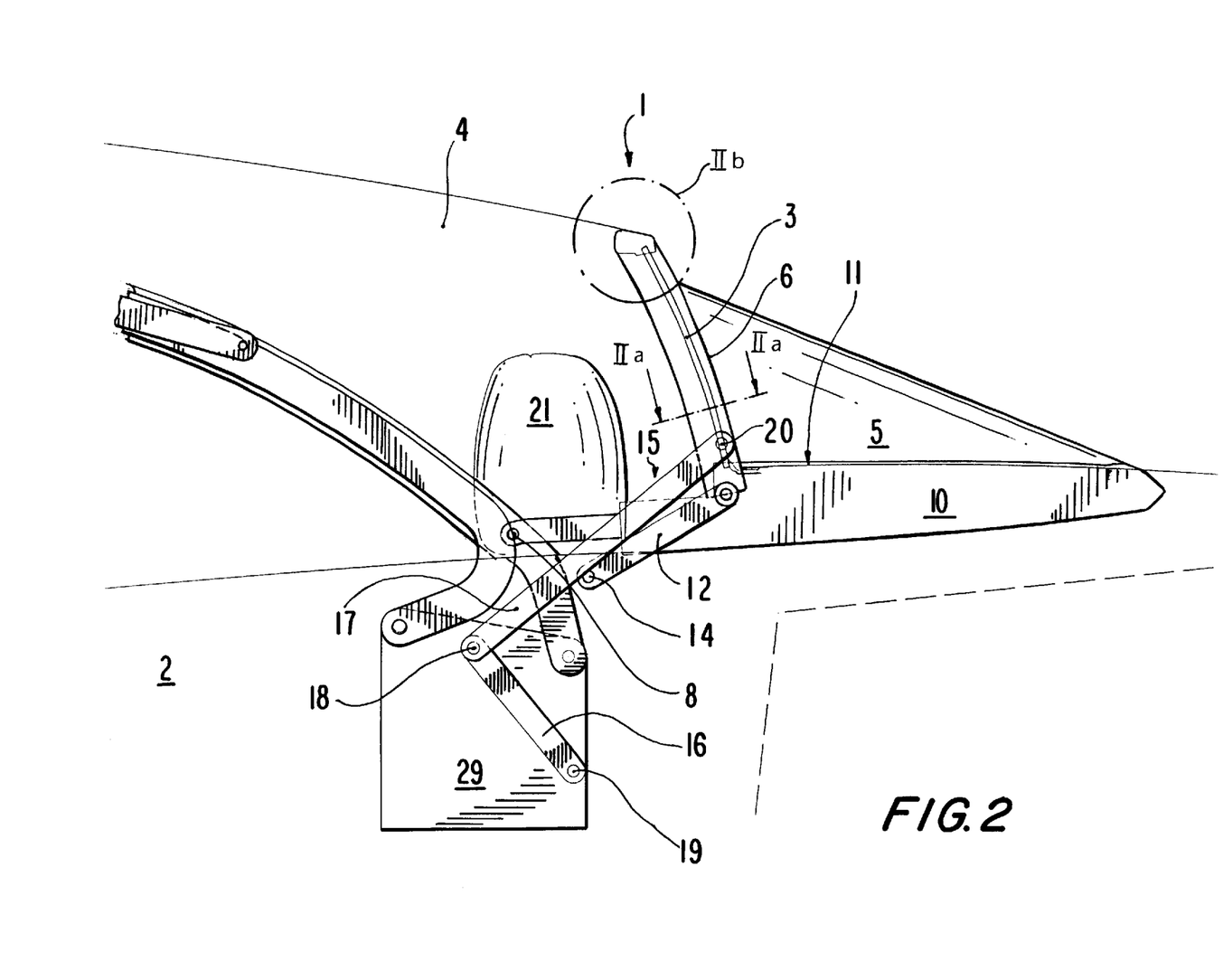
FIG. 2 shows a diagrammatic side view of the rear region of the vehicle with the rear window in the normal position.
Figure 2A:
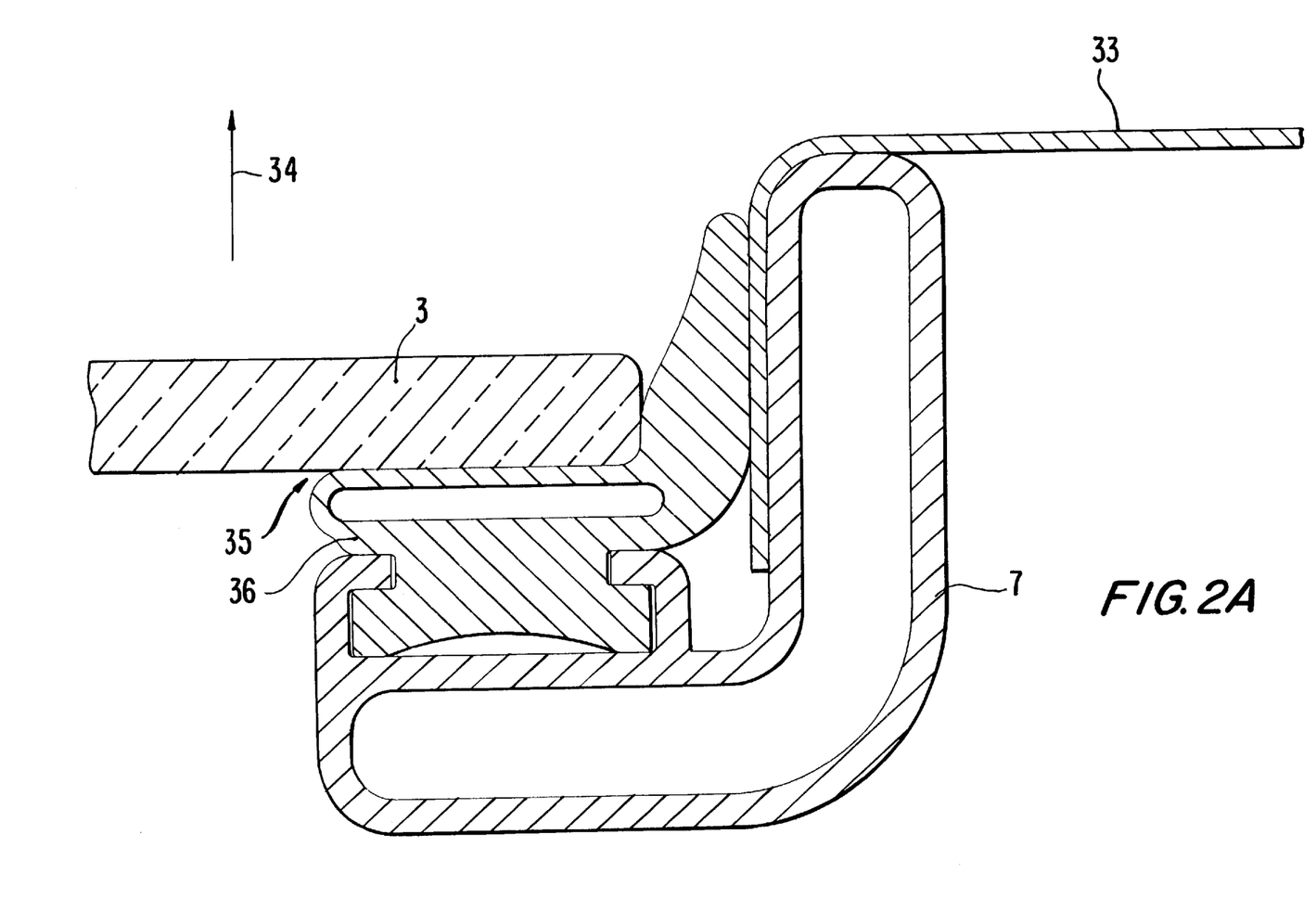
FIG. 2a shows a section along the line IIa—IIa in FIG. 2.
Figure 2B:
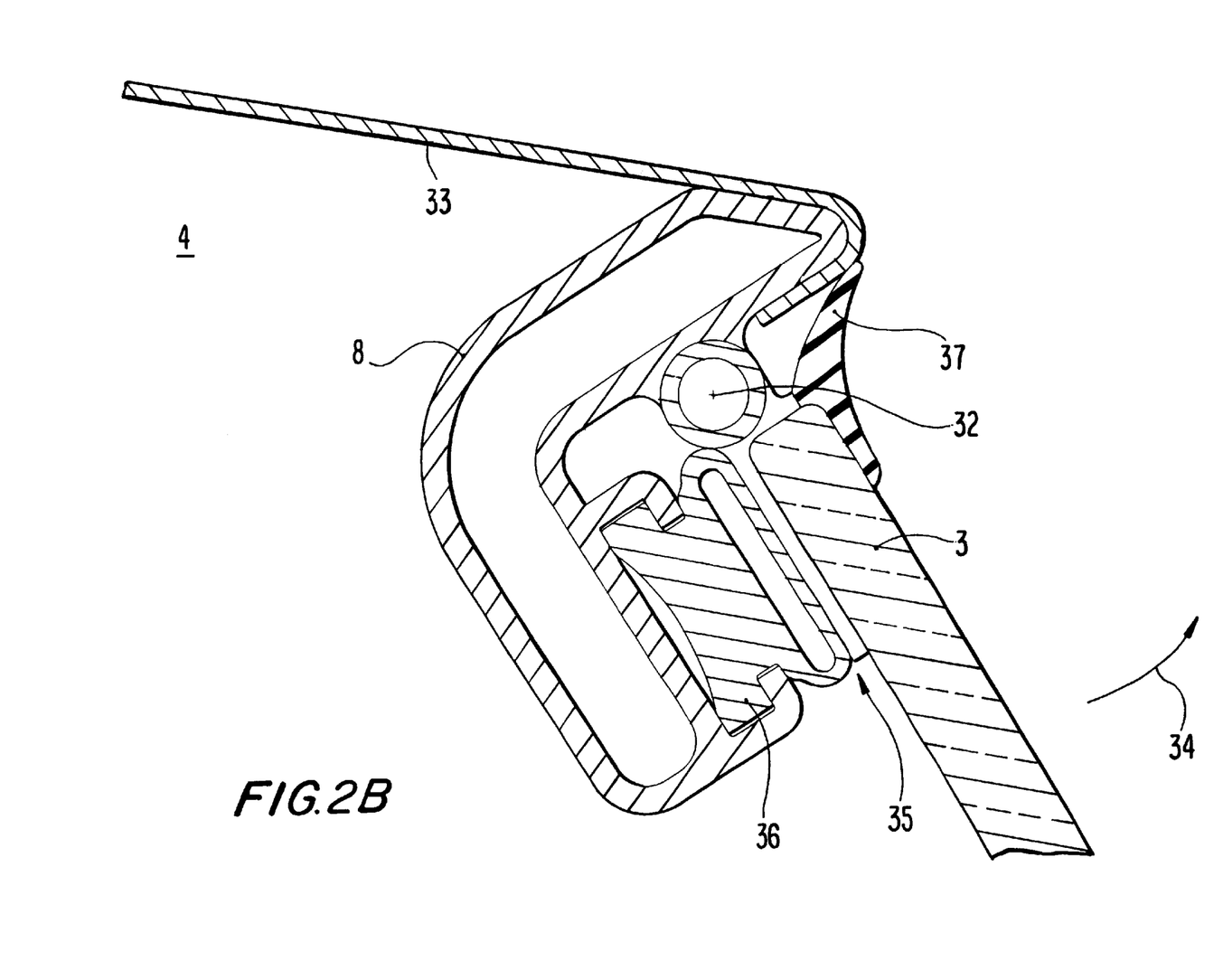
FIG. 2b shows a section along the line IIb—IIb in FIG. 2.
Figure 3:
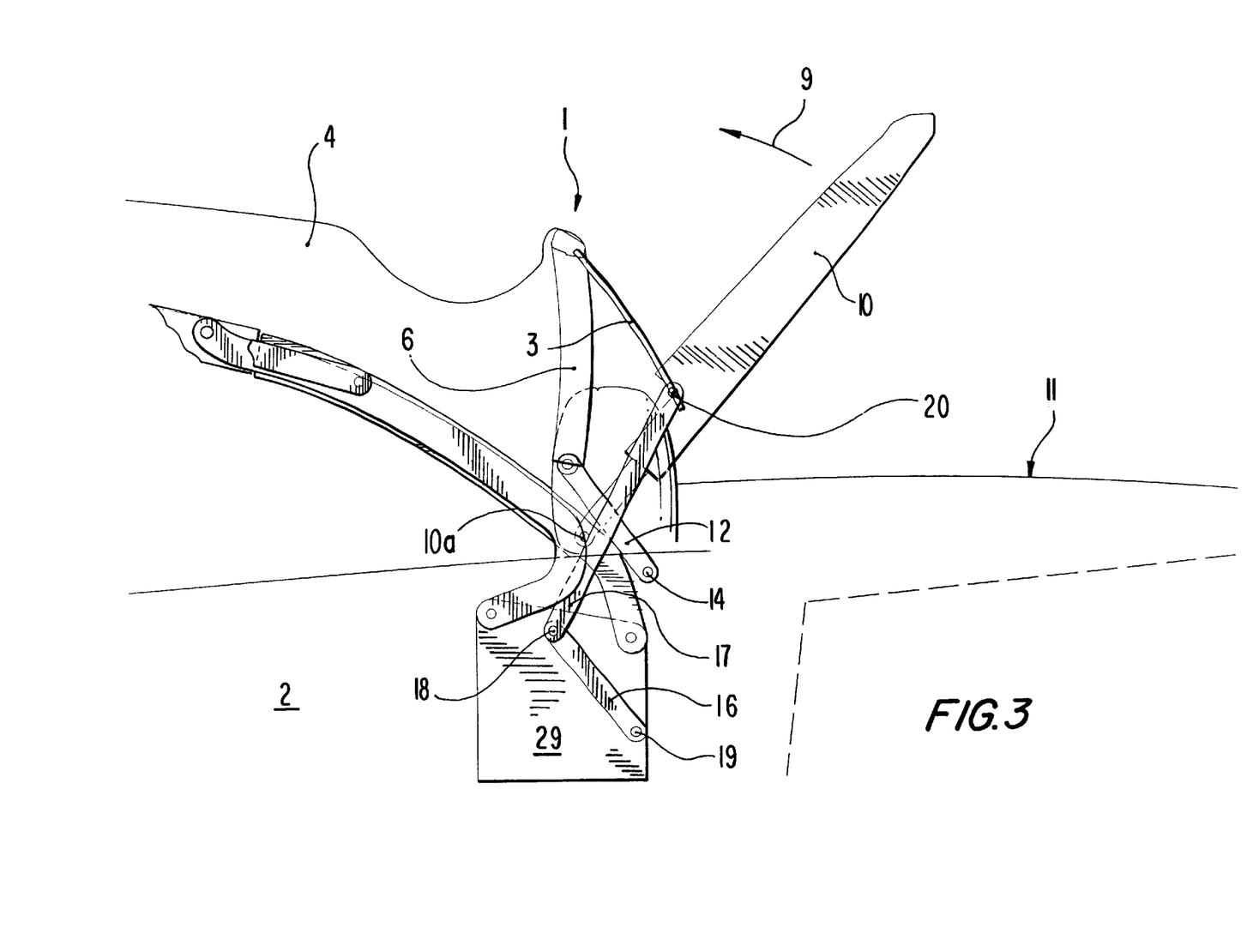
FIG. 3 shows a view, similar to that of FIG. 2, during the opening of the roof.
Figure 4:
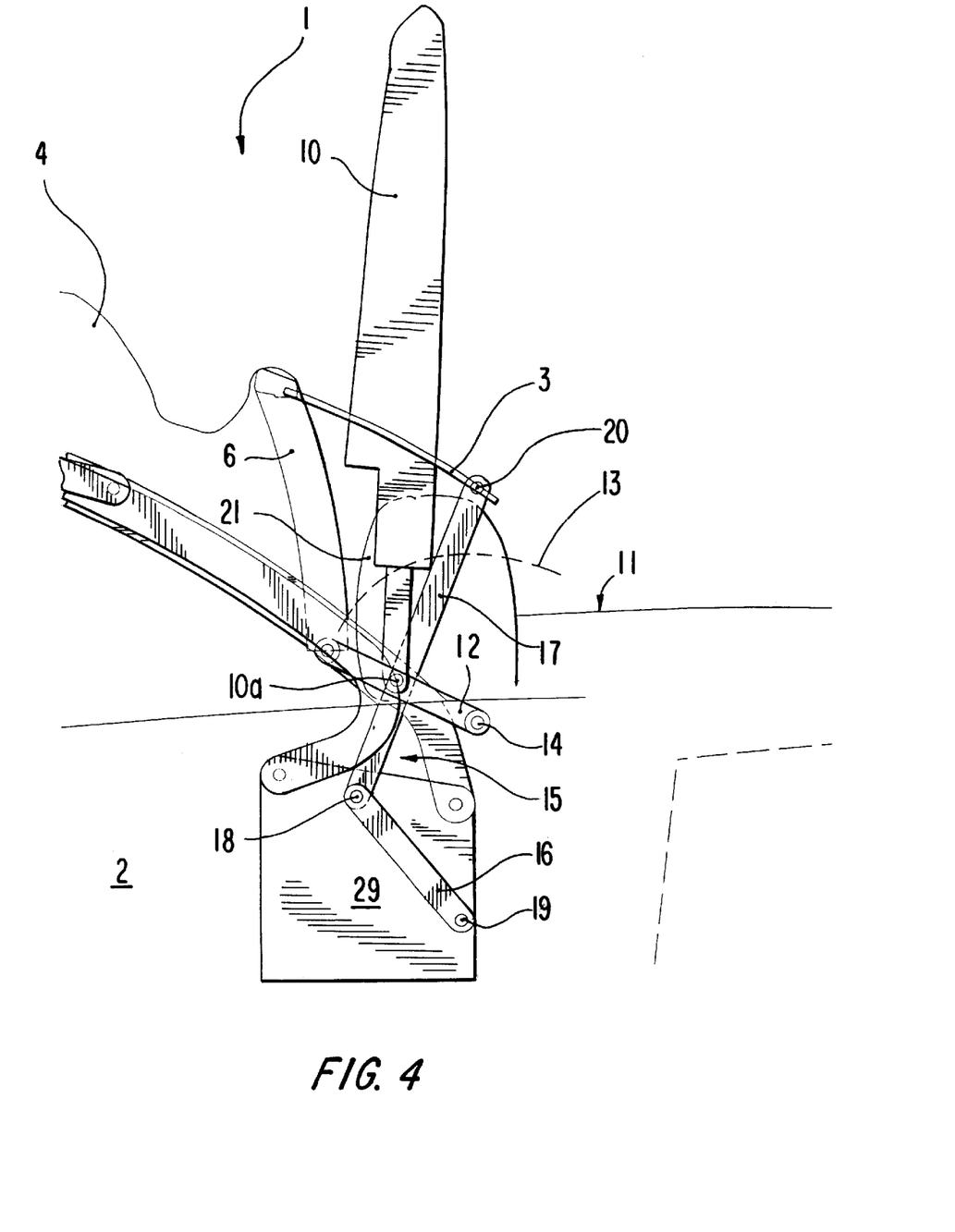
FIG. 4 shows a view, similar to that of FIG. 3, as the opening of the roof has progressed further.
Figure 5:
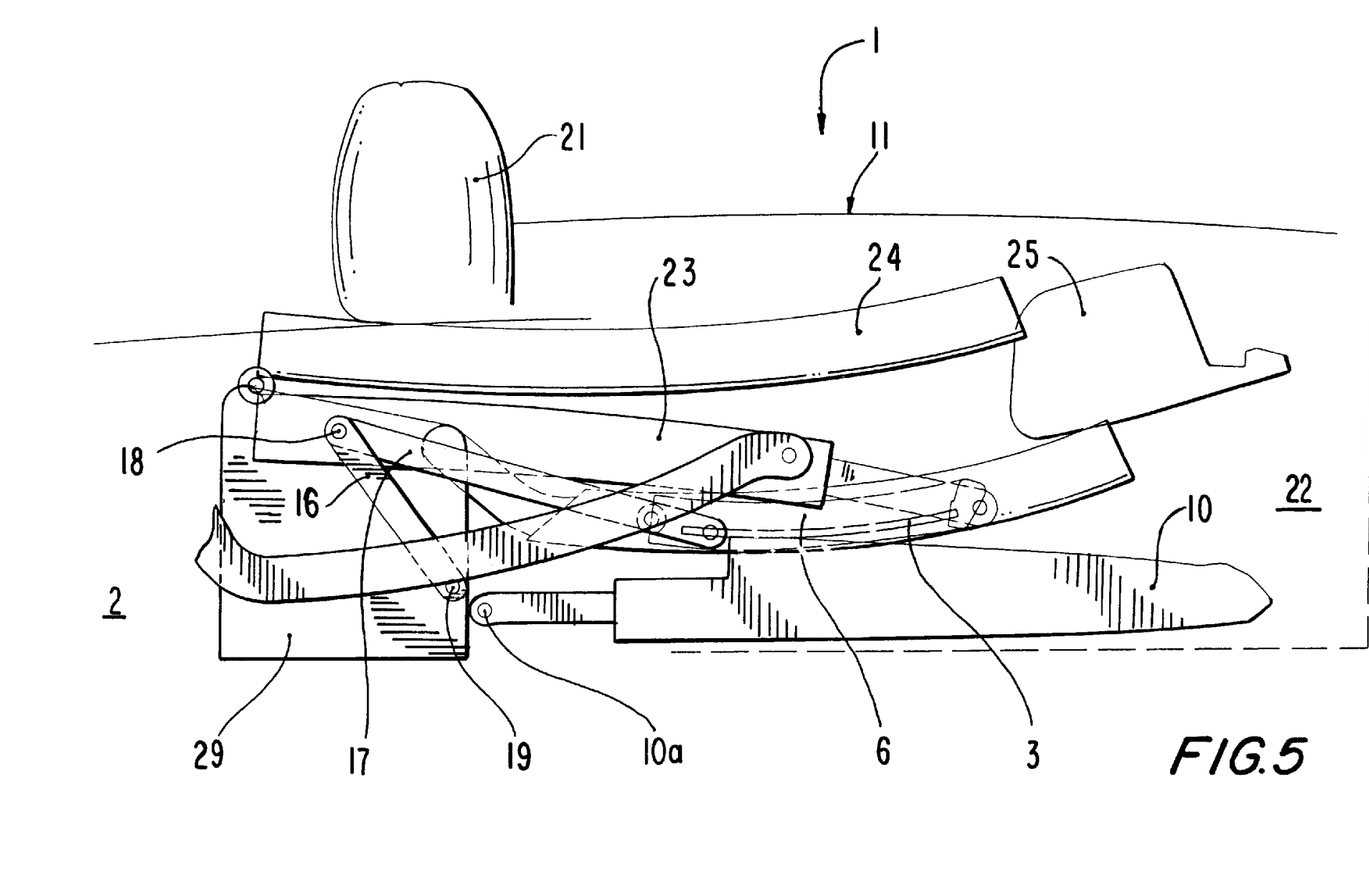
FIG. 5 shows the rear region of the vehicle with the roof completely stowed away.

In FIG. 2, the roof 4 is shown in the closed position. The rear regions 5 of the roof are placed under tension here by tension brackets 10 with respect to a folding top box lid, which is not shown. The tension brackets 10 are in an almost horizontal position. During the opening of the roof 4, which is shown in FIGS. 3 to 5, the tension brackets, which are constructed here as fins 10, initially are swiveled upward about the swiveling axis 10a and forward in the direction of the arrow 9, as a result of which the textile folding top 4, shown here, loses its tension. Furthermore, during the upwards swiveling of the tension brackets 10, the frame 6, which carries the rear window 3 and, in the closed position, stands on the car body 2 in the region of the plane of the window parapet 11, is shifted forward with its lower end on a circular path 13 about the swiveling axis 14 of the lever 12. At the same time, the frame 6, with its lateral legs 7, is guided laterally past any obstacles, such as headrests 21 or roll bars or the heads of the rear passengers. On the other hand, the upper transverse leg 8 is guided above these obstacles and, in this respect, also does not constitute a point of danger for collision with said obstacles. In order to avoid a collision of the rear window 3, held in the frame 6, this window 3, during the opening or closing of the folding top 4, is swiveled up with respect to the frame 6 by a swiveling lever arrangement 15. The swiveling lever arrangement 15 comprises two levers 16, 17, which are coupled together over a joint 18. The lever 16 connects a swiveling axis 19, which is fastened to the car body and disposed in the region of the main bearing 29, with the movable joint 18, from which the swiveling lever 17 extends to the coupling axis 20, which engages the rear window 3 in the lower region. Known hydraulic or electric driving elements may be provided for bringing about the swiveling movement of the swiveling lever arrangement 15. Due to the movement of the swiveling lever arrangement 15, the rear window 3 is swiveled up with respect to the frame 6 at an angle a, which becomes larger as the roof is being opened, so that, as the frame 6 is passed by or over the obstacles, such as the headrests 21, the rear window 3 assumes approximately a horizontal position, so that it can be passed over these obstacles by these means.

A separate driving mechanism may be used for shifting the frame 6. Alternatively, it is also possible, particularly advantageously, to bring about the shifting of the frame 6 under the constraint of the swiveling motion of the tension bracket 10 and the therefrom resulting folding kinematics of the roof 4, so that it is possible to dispense with separate driving and control elements.

In the position shown in FIG. 4, the lid of the box for the folding top, which is not shown and hinged at the rear, can be swiveled up in order to make it possible by these means to stow the folding top 4 in a box 22. The stowed position of the roof 4 is shown in FIG. 5. The fins 10 about the swiveling axes 8, which are guided downward during the movement, are inserted here essentially horizontally in the floor region of the box 22 for the folding top. The rear window 3 is swiveled in once again with respect to the frame 6, so that a parallel disposition of the parts takes place and the angle α is returned to 0. In this stowed position of the roof 4, the rear window does not occupy any space exceeding the space required for the frame 6. The swiveling back of the rear window 3 with respect to the frame 6 is brought about by the coupled swiveling motions of the lever 12 about the axis 14 and of the swiveling lever arrangement 15 about the axes 18 and 19. The frame 6 with the rear window 3 then lies essentially parallel above the fins 10. Above this frame 6, there are a central part 23 and a front part 24 of the roof. The frame 6 is supported with its front end region 25 in the closed position of the roof 4 on a windshield frame. Overall, therefore, the roof is folded in Z-shaped fashion into the box 22 for the folding top. In this folded-in position, the rear window 3 is held as if it could not be pivoted separately, that is, no disadvantages are created with respect to the space relationship as well as with respect to the possibility of damage in the stowed position. The closing of the roof 4 is similar to the opening with the same swiveling up motion of the rear window 3 and can be inferred from the reverse consideration of FIGS. 5 to 3.

In accordance with a particularly advantageous construction, the swiveling up and swiveling back of the rear window 3 is coupled to the opening or closing movement of the roof 4, so that an operating error of the swiveling mechanism during the opening of the roof is prevented and it is not possible to forget to swivel up the rear window 3. This forced coupling can be accomplished, mechanically for example, by a suitable lever, for which the swiveling up of the fins 10 at the same time controls the swiveling lever arrangement 15. On the other hand, an evaluating electronic system can be provided, which detects a respective state of movement of the roof 4.

Figure 6:
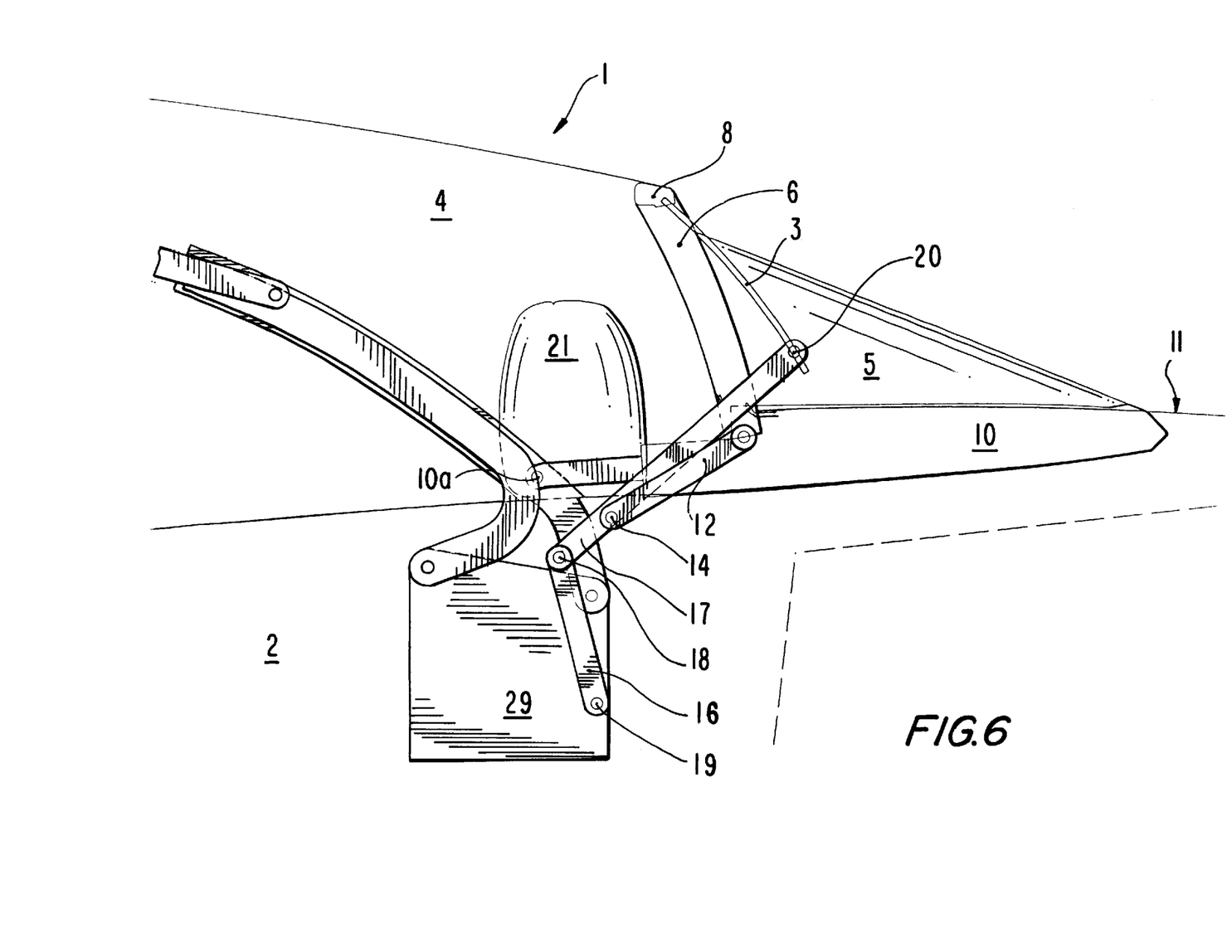
FIG. 6 shows a view, similar to that of FIG. 2, with the rear window swiveled up partially into a venting position.
Figure 7:
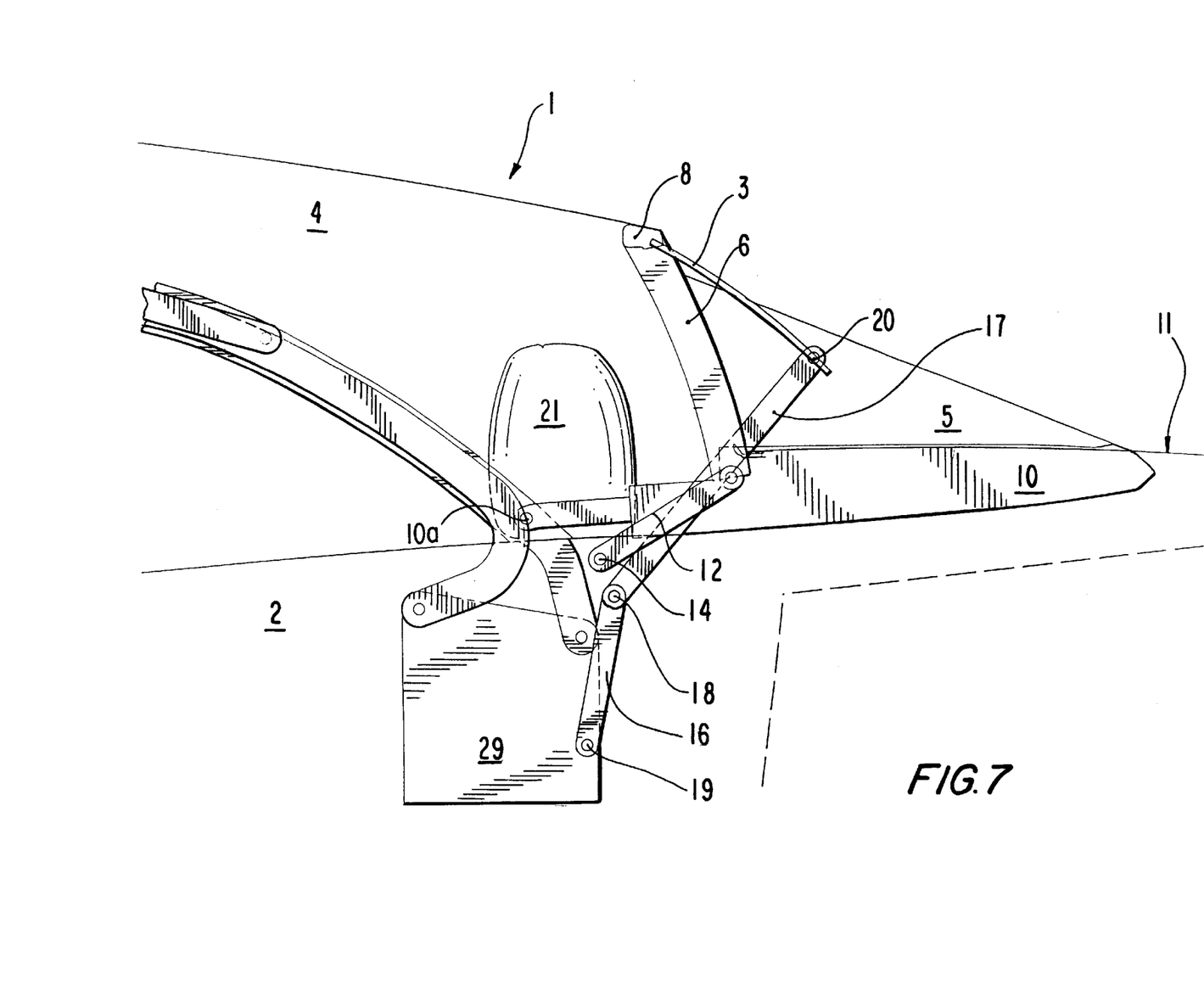
FIG. 7 shows a view, similar to that of FIG. 6, with the rear window swiveled up completely into the venting position.

In FIGS. 6 and 7, the swiveling up of the rear window 3 in the closed position of the roof 4 is shown, in order to attain a venting position by these means. Only the swiveling lever arrangement 15 is operated here, the other opening and closing mechanisms of the roof not being started. The swiveling lever arrangement 15 can also be operated remotely, for instance, from the dashboard. Conventional driving elements can be provided for this purpose. With that, a second possibility is created for controlling the inventive roof, with which the rear window 3 can be moved independently of the closed roof 4.

In accordance with a particularly advantageous embodiment (FIGS. 8 to 10), provisions have been made so that, in the closed position of the roof, the rear window 3 can be moved from a normal position, in which it seals the roof 4 towards the rear, into a lowered position, in which it is below the window parapet line 11 of the car body 2 and, with that, releases the rear section of the roof 4 in the example completely.

Figure 8:
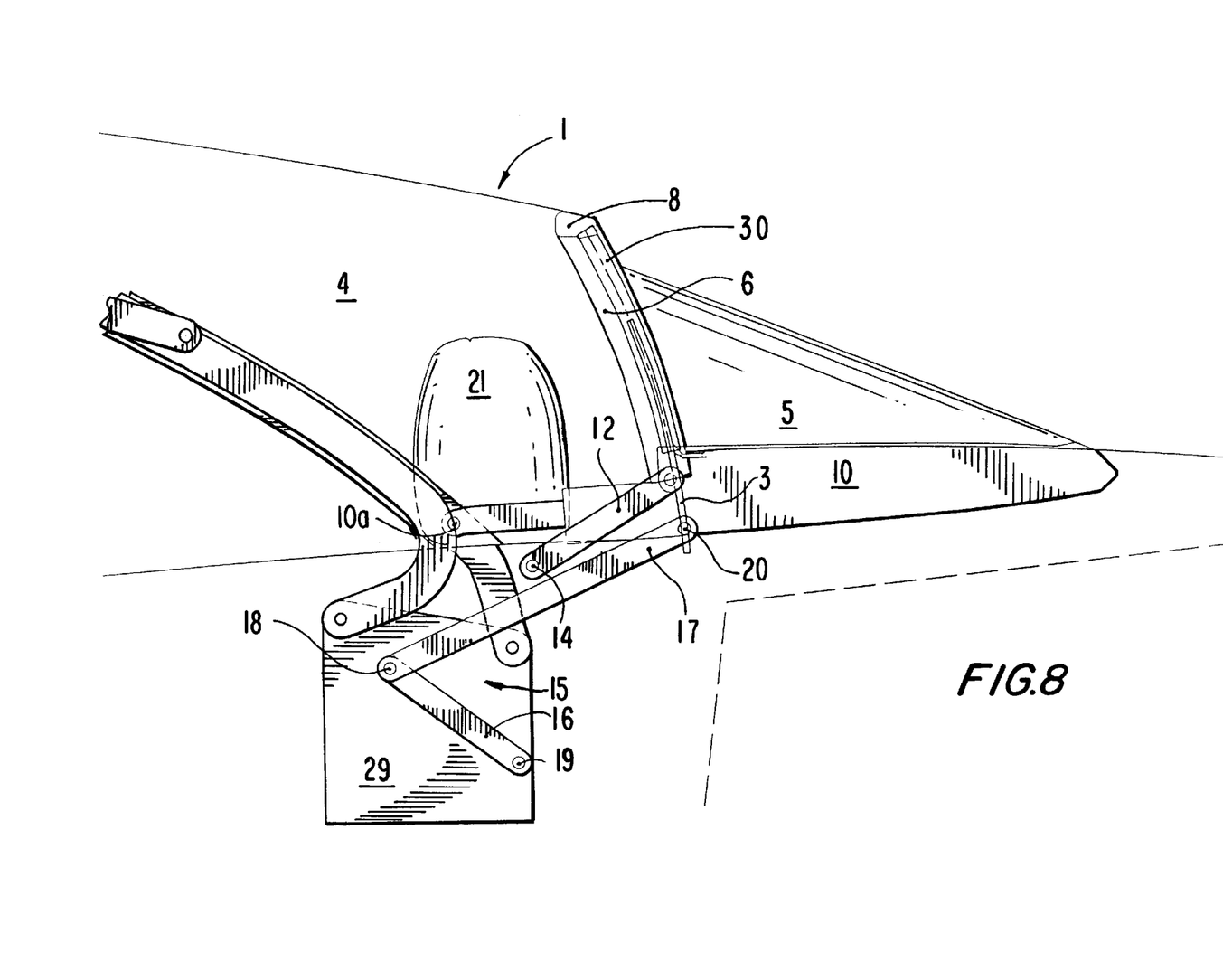
FIG. 8 shows a view, similar to that of FIG. 7, with the rear window in a parallel position and partially lowered.
Figure 9:
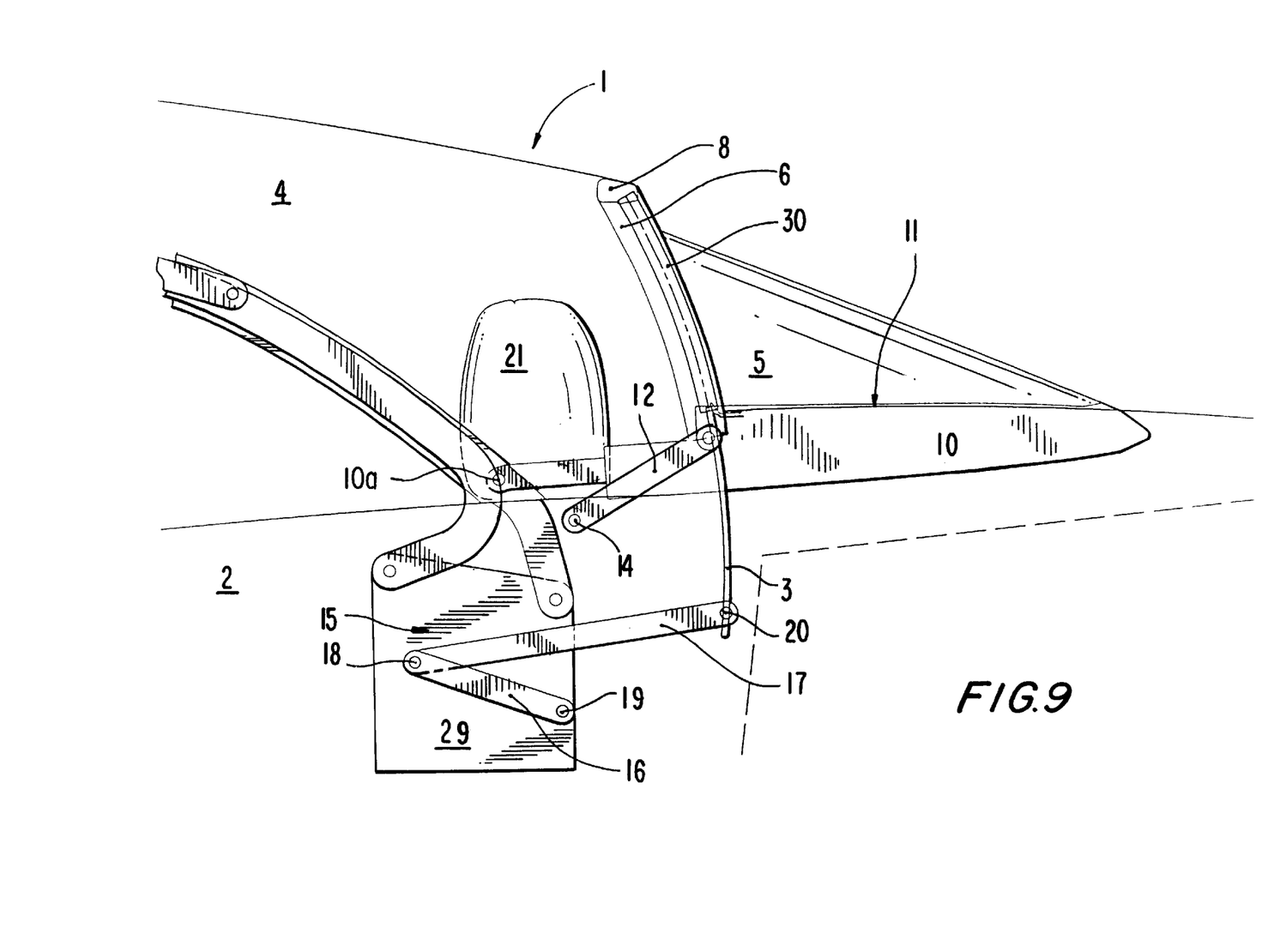
FIG. 9 shows a view, similar to that of FIG. 8, with the rear window completely lowered.

In the example of FIGS. 8 and 9, the lowering takes place owing to the fact that the swiveling lever arrangement 15 at the same time also forms a driving arrangement for lowering the rear window 3, in that a downwards or upwards shifting of the rear window 3 is carried out by swiveling the levers 16 and 17 about the joints 18 and 19. At the same time, the rear window 3 remains held in the frame 6 at least with its upper end region, for which purpose a sliding guide 30, which may be provided with rollers, is provided.

Figure 10:
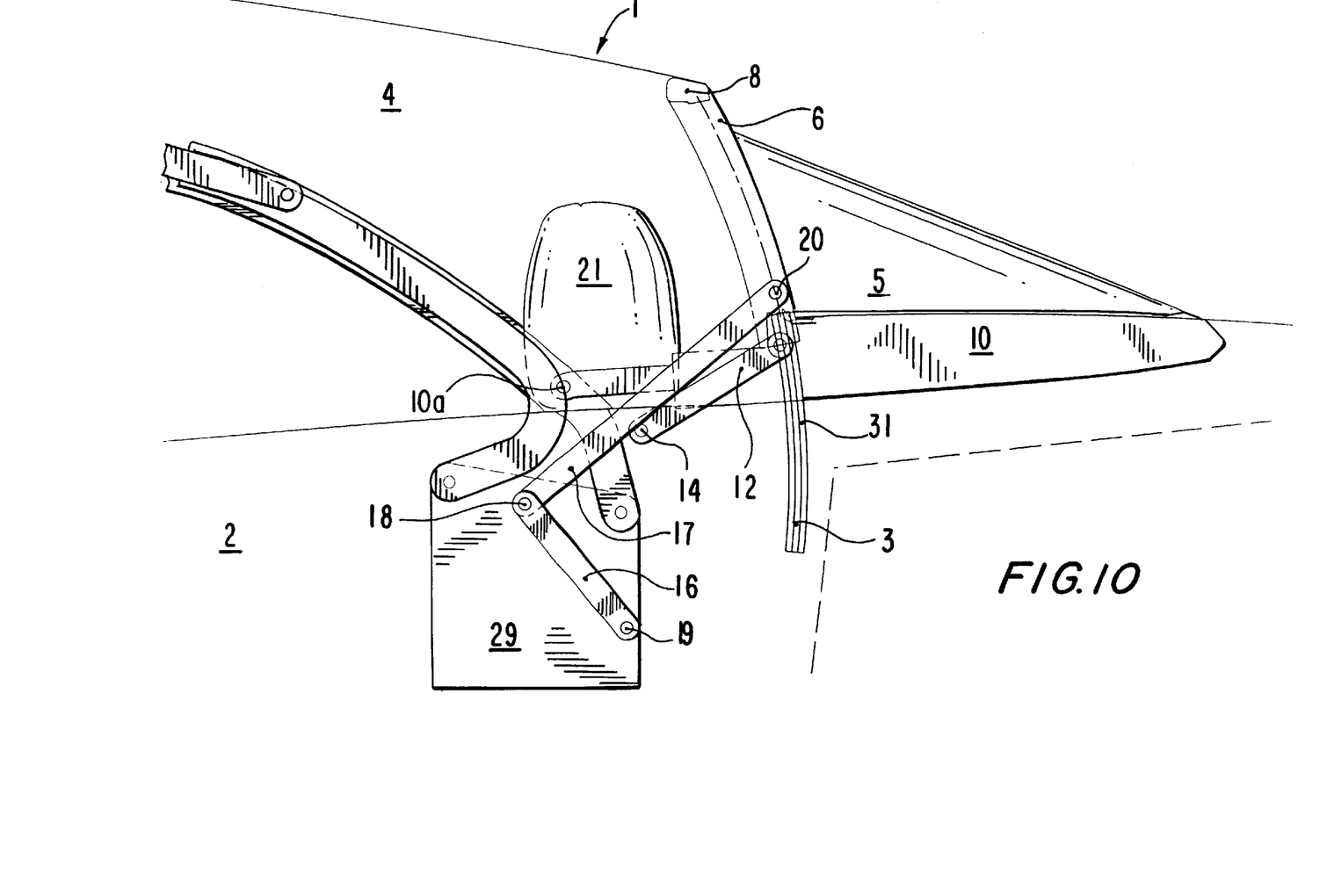
FIG. 10 shows a view, similar to that of FIG. 9, of an alternative embodiment.

The driving levers 16 and 17 can also be replaced by a telescopic guide 31, which is constructed in the form of a drawer pull-out mechanism (FIG. 10) and the driving elements, either electrically or hydraulically or in the form of a sheathed cable, can act over the guide 31 on the rear window 3, which hangs freely in the car body 2, even in the lowered position. Such a solution offers the possibility of integrating the driving elements in the roof area. The construction of a telescopic driving and guiding unit 31 is shown in FIG. 10. Even in the lowered position, the rear window 3 is held here in the pulled-out part of the telescopic guide 31. The driving elements act directly on the guiding parts 31 in the frame. For example, it is possible to provide a sheathed cable, which is moved by an electric motor. The swiveling lever arrangement 15 does not function here. In this example, it is required only for swiveling the rear window 3 during the opening and closing of the roof 4.

If provisions are made for being able to adjust the height of the rear window 3 in this manner, the guiding part 30 is swiveled along with the rear window 3 when the latter is swiveled up. In that case, the frame 6, for example, is constructed L-shaped in cross section and the sliding or telescopic guide 30, 31 is constructed T-shaped or U-shaped in cross section, so that the latter can be swiveled up with respect to the frame.

What we claim is:

1. A convertible roof apparatus for a vehicle comprising a roof structure movable between an up position and a down position, said roof structure comprising a folding roof and at least one tension device connected to said vehicle for movement between a tensioning position for tensioning said folding roof when said roof structure is in said up position and a release position for releasing said tensioning of said folding roof, a rear window unit including a window frame mounted on said roof structure, said window unit including a window movably mounted on said window frame between a closed position and an open position, said tension device being operable to move said window from said closed position to said open position when said tension device is moved from said tensioning position to said release position.

2. A convertible roof apparatus according to claim 1 further comprising an actuating mechanism between said roof structure and said vehicle for effecting relative movement between said window unit and said roof structure when said roof structure is moved between said up and down positions.

3. A convertible roof apparatus according to claim 2 wherein movement of said roof structure between said up and down positions effects relative movement of said window and said window frame between said closed and open positions.

4. A convertible roof apparatus according to claim 1 wherein said window unit includes a pivot device pivotally mounting said window on said window frame.

5. A convertible roof apparatus according to claim 4 wherein said window has first and second lateral edge portions, said first lateral edge portion being at a higher elevation than said second lateral edge portion when said roof structure is in said up position, said pivot device pivotally mounting first lateral edge portion on said window frame.

6. A convertible roof apparatus according to claim 5 wherein said window frame has a lateral edge section which is disposed at a higher elevation than said second lateral edge portion of said window when said roof structure is in said up position, said pivot device pivotally mounting said first lateral edge portion of said window to said lateral edge section of said window frame.

7. A convertible roof apparatus according to claim 2 wherein said roof structure has an intermediate position between said up position and said down position, said actuating mechanism disposing said window in said closed position when said roof structure is in said up position and disposing said window in said open position when said roof structure is in said intermediate position.

8. A convertible roof apparatus according to claim 7 wherein said actuating mechanism disposes said window in said closed position when said roof structure is in said down position.

9. A convertible roof apparatus according to claim 7 wherein said second lateral edge portion of said window is at a higher elevation when said roof structure is at said intermediate position than when said roof structure is at said up position such that said second lateral edge portion elevates as said roof structure moves from said up position to said intermediate position.

10. A convertible roof apparatus according to claim 7 wherein said window is in an approximate horizontal disposition when said roof structure is in said intermediate position.

11. A convertible roof apparatus according to claim 5 wherein said actuating mechanism includes a pivotal connection pivotally connected between said second lateral edge portion of said window and said vehicle.

12. A convertible roof apparatus according to claim 11 wherein said pivotal connection includes a first pivotal arm having one end portion pivotably connected to said second lateral edge portion of said window and a second pivotal arm having one end portion pivotably connected to said vehicle, each of said first and second pivotal arms having other end portions pivotably connected to one another.

13. A convertible roof apparatus according to claim 11 wherein said pivotal connection is pivotably connected to a support part of the vehicle, said roof structure being pivotally connected to said support part as said roof structure moves between said up and down positions.

14. A convertible roof apparatus according to claim 1 wherein said roof structure includes a window frame guide mechanism for guiding said window frame between an operable position and a stored position when said roof structure is moved between said up and down positions respectively.

15. A convertible roof apparatus according to claim 1 wherein said window frame slidably mounts said window, said actuating mechanism being operable to slide said window relative to said window frame between shut and non-shut positions while said roof structure is in said up position.

16. A convertible roof apparatus according to claim 1 wherein said window frame has first and second lateral end parts, said first lateral end part being at a higher elevation than said second lateral end part when said roof structure is in said up position, and a pivotal connection between said second lateral end part and said vehicle.

17. A convertible roof apparatus according to claim 16 wherein said pivotal connection includes a lever having one end portion pivotally connected to said second lateral end part of said window frame and another end portion pivotally connected to said vehicle.

18. A convertible roof apparatus according to claim 4 wherein said actuating mechanism is operable to pivot said window about said pivot device between venting and non-venting positions as said roof structure remains in said up position.

19. A convertible roof apparatus according to claim 1 wherein said roof structure comprises a cover material which extends to a rear region, said rear region having two lateral end portions, said two lateral end portions extending rearwardly of said window unit when said roof structure is in said up position.

20. A convertible roof apparatus according to claim 19 wherein said window unit extends between said two lateral end portions when said roof structure is in said up position.

21. A convertible roof apparatus according to claim 19 wherein each of said two lateral end portions have a generally triangular configuration.

22. A convertible roof apparatus according to claim 19 wherein said roof structure includes tension brackets connected to the vehicle body for tensioning said two lateral end portions when said roof structure is in said up position.

23. A convertible roof apparatus for a vehicle comprising a roof structure movable between an up position and a down position, a rear window unit on said roof structure, said rear window unit including a window frame and a window, and an actuating mechanism for effecting relative movement between said window frame and said window when said roof structure is moved between said up and down positions.

24. A convertible roof apparatus according to claim 23 wherein said roof structure comprises a folding roof and at least one tension bracket, said tension bracket being operable connected to said vehicle for movement between a tensioning position for tensioning said folding roof when said roof structure is in said up position and a release position for releasing said tensioning of said folding roof when said roof structure is in said down position.

25. A convertible vehicle according to claim 23 wherein said roof structure includes a textile material, a tensioning device including a tension lever pivotally mounted on said vehicle body between a tensioning position and a release position, said tension lever when in said tensioning position tensioning said tensioning device and said textile material, said tensioning lever when in said release position releasing the tension of said tensioning device and the tension of the textile material.

26. A convertible vehicle according to claim 25 wherein said connecting part remains in a fixed position relative to said vehicle body as said tension lever moves between said tensioning position and said released position.

27. A convertible vehicle according to claim 25 wherein said rear frame part remains in a fixed position relative to said connecting part as said tension lever moves between said tensioning position and said released position.

28. A convertible vehicle according to claim 25 wherein said tension lever is disposed in a generally horizontal position when in said tensioning position and in a generally upright position when in said release position.

29. A convertible roof apparatus for a vehicle comprising a roof structure movable between an up position and a down position, said roof structure comprising a folding roof and at least one tension device connected to said vehicle for movement between a tensioning position for tensioning said folding roof when said roof structure is in said up position and a release position for releasing said tensioning of said folding roof, a rear window unit on said roof structure, said tension device being operable to move said window unit relative to said roof structure when said tension device is moved from said tensioning position to said release position.

* * * * *